United States Patent [19]
Blaha et al.

[11] 3,962,871
[45] June 15, 1976

[54] CONTROL MEANS ADJUSTABLY SYNCHRONIZING OPERATION OF A SINGLE PUMP WITH A PLURALITY OF CONTROL VALVES

[75] Inventors: James G. Blaha; Richard C. Maher, both of Painesville, Ohio

[73] Assignee: Towmotor Corporation, Mentor, Ohio

[22] Filed: Apr. 30, 1975

[21] Appl. No.: 572,995

[52] U.S. Cl.................................. 60/433; 60/484; 60/DIG. 2; 91/413
[51] Int. Cl.²..................... F15B 15/18; F15B 11/16
[58] Field of Search................ 60/433, 484, DIG. 2; 91/413

[56] References Cited
UNITED STATES PATENTS

| | | | |
|---|---|---|---|
| 3,014,344 | 12/1961 | Arnot | 60/433 |
| 3,589,130 | 6/1971 | Flaschar et al. | 60/389 |
| 3,593,523 | 7/1971 | Flaschar et al. | 60/427 |
| 3,864,913 | 2/1975 | Herrmann | 60/484 X |

*Primary Examiner*—Edgar W. Geoghegan
*Attorney, Agent, or Firm*—Phillips, Moore, Weissenberger Lempio & Strabala

[57] ABSTRACT

A hydraulic circuit including a single pump and a plurality of control valves for communicating actuating fluid to the separate hydraulic motors from the single pump includes a synchronizing unit for initiating and terminating operation of the pump in response to operation of any of the control valves, the synchronizing unit including a pivotable gang plate adjustably mounting cam shoes separately associated with synchronizing levers connected to actuating elements for each of the control valves, the single gang plate thus being movable in response to operation of any one of the valves in order to initiate or terminate operation of the pump in closely synchronized relation to positioning of any one of the control valves to communicate the pump with one of the motors.

7 Claims, 3 Drawing Figures

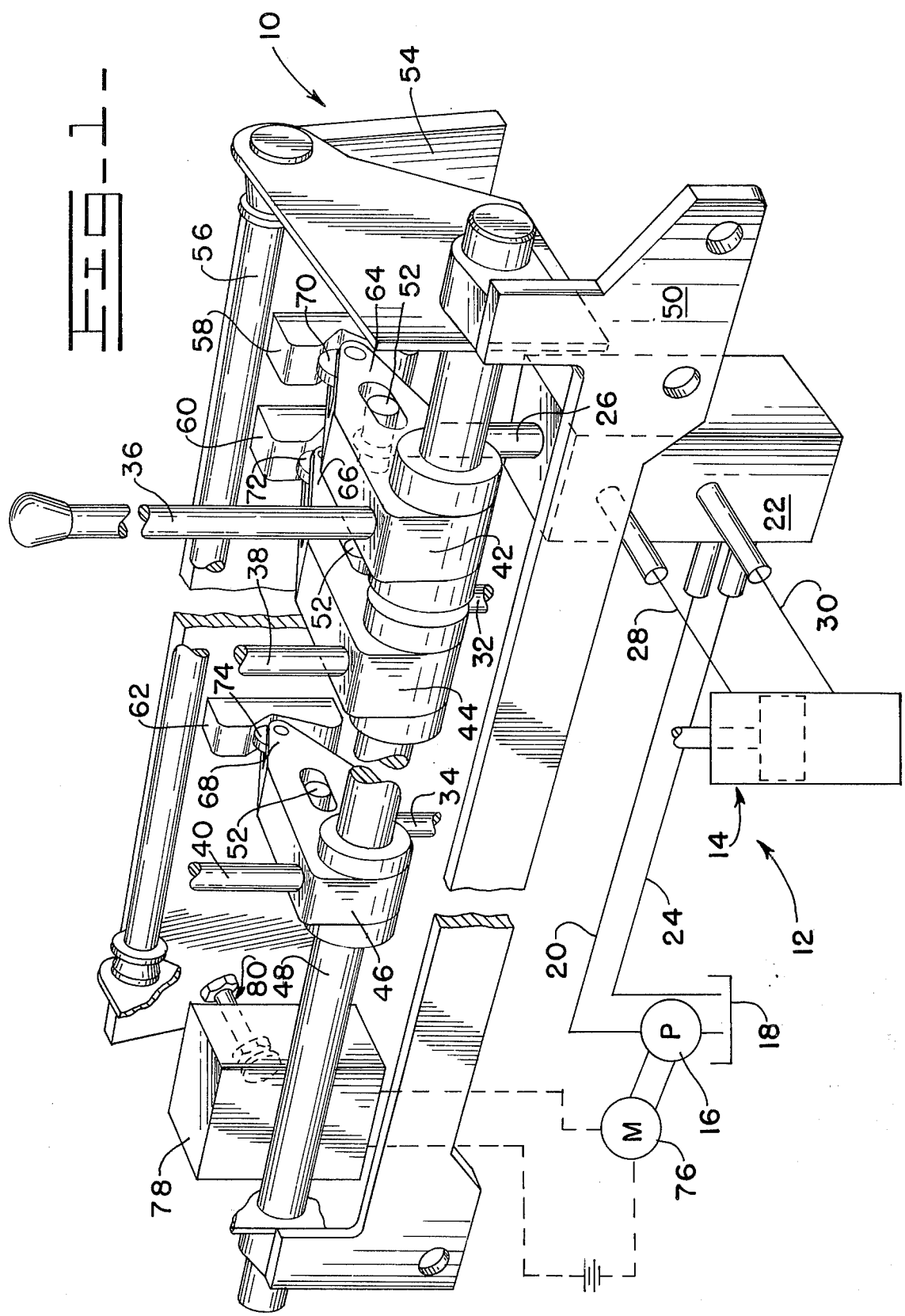

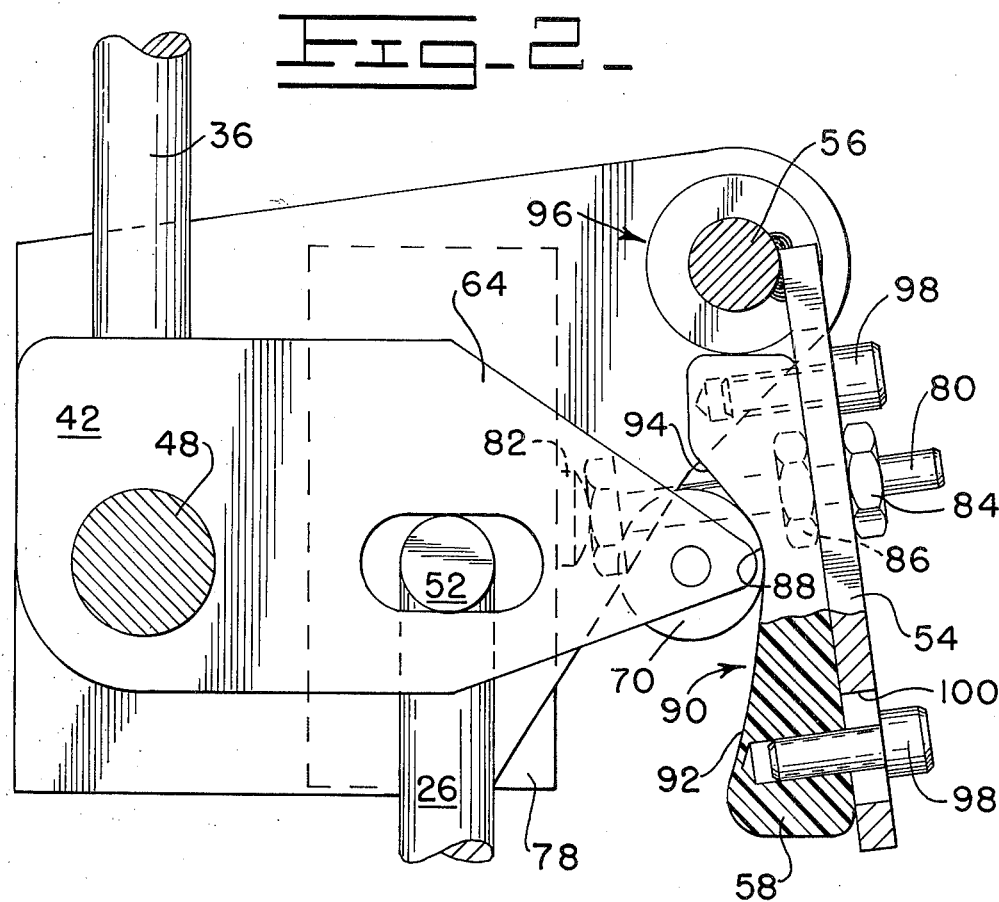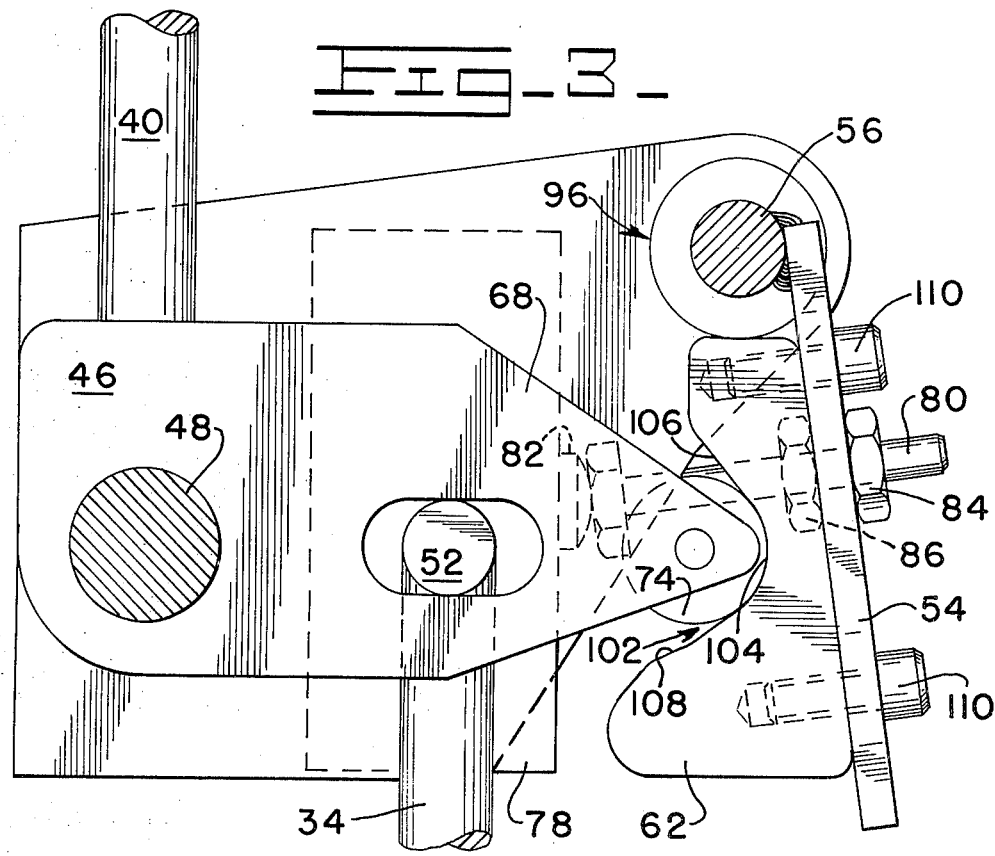

CONTROL MEANS ADJUSTABLY SYNCHRONIZING OPERATION OF A SINGLE PUMP WITH A PLURALITY OF CONTROL VALVES

BACKGROUND OF THE INVENTION

The present invention relates to synchronizing means for use in a hydraulic circuit of the type including a plurality of hydraulic motors operable by separate control valves with fluid under pressure for the various valves and motors being supplied by a single pump. More particularly, the invention relates to such a hydraulic circuit wherein the synchronizing means includes a single element for operating the pump, the single element being responsive to operation of any one of the control valves.

Hydraulic circuits of the type contemplated by the present invention are commonly employed, for example, in material handling vehicles such as fork lift trucks where the vehicle includes a number of hydraulic motors or jacks which must be separately operable to regulate material handling implements associated with the vehicle. One particular example of such a combination of motors and separate valves may be seen in the conventional mast unit of a fork lift truck. A number of hydraulic jacks may be employed in conjunction with such mast units to accomplish a variety of functions including raising and lowering of a carriage assembly upon the mast unit, tilting or "racking back" the carriage and mast unit to secure a load upon the carriage, operating clamping mechanisms commonly associated with the carriage or to transversely position the carriage in a side shifting mode for alignment with a load.

Numerous other examples are available of vehicles or machines including a number of hydraulic motors which may be operated by a single hydraulic pump. It is sufficient to realize that the synchronizing unit of the present invention may be adapted to any such vehicle or machine without limitation.

Generally, it is well known to have separate control valves for separate hydraulic motors and to supply fluid under pressure to all of the control valves from a single hydraulic pump. In this regard, reference is particularly made, for example, to U.S. Pat. No. 3,593,523 and U.S. Pat. No. 3,589,130. Each of these patents relates to such a hydraulic circuit wherein actuating fluid under pressure for a plurality of hydraulic motors is provided by a single pump. However, these references are also illustrative of the relatively complex problem of assuring accurate synchronization between operation of the pump and movement of any one of the control valves for the separate motors to accomplish its operation. The plurality of control valves contemplated for use within such a hydraulic circuit are often of a type commonly referred to as "closed center" valves. These valves have "dead bands" in their neutral positions so that the control valve must be moved a discrete distance out of its neutral condition before communication is established with its motor. Such valves present a particular problem in synchronization since it is desirable to initiate operation of the pump at precisely the time when the control valve passes the dead band and commences to open fluid communication to the motor.

An additional problem is encountered in such hydraulic circuits since there is often only a limited amount of space available for the control valves and associated components. For example, in fork lift trucks, it is desirable to arrange these components in a relatively compact console at the operator station. Actuating elements or control levers for the various valves may then be positioned for ready access by an operator. Accordingly, it is necessary that the controls for such a hydraulic circuit not only permit close synchronization between operation of the valves and the single pump but also that the entire control unit be of relatively simple and reliable design in addition to forming a compact unit.

SUMMARY OF THE INVENTION

Accordingly, it is an object of the present invention to provide a hydraulic circuit of the type including a plurality of hydraulic motors and respective control valves with a single pump for supplying fluid under pressure to the valves, the circuit including synchronizing means for regulating operation of the single pump simultaneously with operation of any one of the plurality of control valves.

It is another object of the invention to provide a synchronizing unit for use in conjunction with a hydraulic circuit of the type referred to above.

The present invention accomplishes these objects while also providing a relatively simple and compact design through the use of a single actuating element or plate which is pivotally movable to regulate operation of the single pump, the single plate being associated with each of the control valves by separate cam means which are separately adjustable to permit close synchronization of operation of the pump simultaneously with operation of any one control valve.

Additional objects and advantages of the invention are made apparent in the following description having reference to the accompanying drawings.

BRIEF DESCRIPTION OF THE DRAWINGS

FIG. 1 is a partially schematic representation, certain components being illustrated only in part for purposes of simplicity, of a hydraulic circuit including synchronizing means constructed according to the present invention.

FIG. 2 is a fragmentary view, with parts in section, of a separate cam means and synchronizing lever for accomplishing operation of a single pump by one of a plurality of control valves.

FIG. 3 is a similar fragmentary view of another embodiment of the combination of FIG. 1.

DESCRIPTION OF THE PREFERRED EMBODIMENT

As noted above, the present invention is particularly directed toward a synchronizing unit for use in conjunction with a hydraulic circuit of the type including a plurality of hydraulic motors with separate control valves and a single pump for supplying fluid under pressure to the various control valves. The synchronizing unit is generally indicated at 10 in FIG. 1 while that portion of the hydraulic circuit including the plurality of motors, the plurality of control valves and the single pump is generally indicated at 12.

The motor, valve and pump combination is conventional within the prior art and, accordingly, certain repetitious elements within the hydraulic circuit are omitted for purposes of simplicity while other of these standard components within the hydraulic circuit are illustrated schematically, again for the purpose of facilitating an understanding of the inventive portions of the circuit.

Continuing with particular reference to FIG. 1, one of the plurality of hydraulic motors is illustrated as a jack which is generally indicated at 14. A single pump of the type contemplated by the present invention is indicated at 16 together with a sump or reservoir 18. The pump conventionally draws fluid from the sump and delivers fluid under pressure into a conduit 20 which is in communication with a plurality of control valves respectively associated with each of the hydraulic motors or jacks. One such control valve is indicated at 22. Each of the valves 22 is also in communication with the sump 18 by means of a conduit 24. In addition, each of the control valves includes an axially movable spool, such as that indicated at 26 for the valve 22. The spool is operable to communicate the inlet conduit 20 with one of a pair of conduits 28 and 30 separately communicating the valve 22 with the rod and head ends of the jack 14.

For use in conjunction with a double-acting jack, the control valve 22 is of a conventional type for communicating the inlet conduit 20 with either end of the jack while the other end of the jack is placed in communication with the sump 18 through the other conduit 24. However, the present invention contemplates a combination of control valves for a plurality of double-acting and/or single-acting motors. Both the motors and control valves of either type are conventional within the prior art.

In a single-acting jack, its associated control valve is operable to communicate fluid under pressure from the conduit 20 to only one end of the jack while at the same time communicating the other end of the jack to the sump 18. The control valve for such a single-acting jack would have an additional operating position wherein one or both ends of the jack would be placed in communication with the sump to permit operation of the jack in the opposite direction, for example, under the influence of gravity. In any event, for either a double-acting motor and valve combination or a single-acting motor and valve combination, it is essential to closely synchronize operation of the pump with operation of the control valve, in one direction in the case of a single-acting motor, or both directions in the case of a double-acting motor.

In summary as to the hydraulic circuit, one of the motor and valve combinations is indicated at 14 and 22 in FIG. 1. Similar motor and valve combinations are represented by fragmentary spool portions 32 and 34 which correspond to the spool 26.

Separate actuating elements or control levers for the spools 26, 32 and 34 are respectively indicated at 36, 38 and 40. The control levers are respectively secured to trunnion mounting blocks 42, 44 and 46 which are each rotatably mounted upon a single shaft 48 supported by a base structure 50. The various spools 26, 32 and 34 have separate cross-pieces 52 for pivotable connection to the respective trunnion mounts. Accordingly, any one of the control levers 36, 38 or 40 may be separately moved in angular fashion about the common axis formed by the shaft 48 to position the respective spool 26, 32 or 34 and thus separately effect operation of one of a plurality of associated motors.

Within such a combination, it is desirable to closely synchronize operation of the pump 16 to deliver fluid under pressure into the conduit 20 at precisely the same time any one of the control levers 36, 38, or 40 is moved sufficiently in one or both directions in order to open communication between the conduit 20 and any one of the hydraulic motors such as that indicated at 14.

The function described within the preceeding paragraph is accomplished by the synchronizing unit 10 which is described immediately below.

The synchronizing unit 10 includes a single gang plate 54 which is pivotally supported by a shaft 56 arranged in parallel relation with the shaft 48. Generally, it may be seen that the single plate 54 supports separate cam shoes 58, 60 and 62 generally in alignment with the control levers 36, 38 and 40.

Each of the trunnion mounts 42, 44 and 46 is formed with an extension indicated respectively at 64, 66 and 68 to function as a synchronizing lever together with the respective cam shoes. In addition, each of the synchronizing levers 64, 66 and 68 includes a bearing means preferably in the form of a trunnion mounted roller, the rollers being respectively indicated at 70, 72 and 74.

Before proceeding to a more detailed description as to the construction and mode of operation of the cam shoes and the synchronizing levers, it is noted that the single pump 16 is driven by an electrical motor 76 which is regulated by a switch box 78. The switch 78 is also arranged adjacent one end of the gang plate 54 in order to permit operation of the pump 16 by a pump actuating element 80 which is attached to the common gang plate 54. The construction and contemplated mode of operation of the switch 78 as well as the cam shoes 58, 60 and 62 is set forth in greater detail below having specific reference to either FIG. 2 or FIG. 3.

Referring now to FIG. 2, it may be seen that the switch 78 includes an actuating button 82 which is urged rightwardly or toward the common gang plate 54 by a spring (not shown). The actuating button 82 is illustrated in a position where operation of the electrical motor 76 and pump 16 is terminated. However, as the button 82 is allowed to move rightwardly, it initiates operation of both the electrical motor 76 and pump 16.

The pump actuating element 80 is adjustable relative to the common gang plate 54 by means of the adjusting nuts 84 and 86. The nuts 84 and 86 may be used to adjust the effective length of the actuating element 80 in order to closely regulate timing for the switch 78 relative to movement of the common gang plate 54.

The cam shoe 58 which is illustrated in FIG. 2 is particularly contemplated for association with a single acting jack and associated control valve as represented for example by the jack 14 and valve 22 in FIG. 1. For example, the control valve 22 and its spool 26 may be conventionally configured so that as the spool 26 is shifted upwardly, fluid under pressure within the inlet conduit 20 is communicated through the conduit 30 to the head end of the jack 14 for example to accomplish a lifting operation. Downward movement of the spool 26 serves primarily to communicate the head end of the jack 14 with the sump 18. Retraction of the jack 14 tends to be accomplished under the influence of gravity so that there is no need for introducing fluid under pressure into the rod end of the jack. Accordingly, the valve 22 and spool 26 may be configured so that upon downward movement of the spool 26 both of the conduits 28 and 30 are in communication with the sump. Fluid is thereby exhausted from the head end of the jack while make-up fluid is allowed to enter the rod end of the jack in order to avoid cavitation problems.

The spool 26 is illustrated in each of FIGS. 1 and 2 within a neutral position. With the control lever 36 and synchronizing lever 64 in their corresponding positions, the roller 70 engages a central point 88 along an actuating surface 90 defined by the cam shoe 58. It may be further seen from FIG. 2 that the cam shoe has a different configuration above and below its central point 88.

The lower portion of the actuating surface 90, as indicated at 92, is formed along an arc struck about the center of the shaft 48. Accordingly, as the control lever 36 is shifted rightwardly as viewed in FIG. 2 to urge the spool 26 downwardly, the roller 70 moves along the surface portion 92 and does not change the position of the common gang plate 54.

An upper portion 94 of the actuating surface has a greater angular configuration so that as the control lever 36 is shifted leftwardly to move the spool 26 upwardly, the cam shoe 58 and the common gang plate 54 are pivoted rightwardly about the shaft 56. This permits the actuating button 82 to move rightwardly and initiate operation of the electrical motor 76 and pump 16 (see FIG. 1). In terminating operation of the motor, the control lever 36 will again be shifted rightwardly toward the position illustrated in FIG. 2. As the roller 70 again approaches engagement with the central point 88 along the actuating surface 90, the gang plate 54 is rotated in clockwise fashion as viewed in FIG. 2 by its spring means 96. Thus, the pump actuating element 80 is again urged to the left to move the actuating button 82 and terminate operation of the electrical motor 76 and pump 16.

The cam shoe 58 is preferably formed from elastomeric material to facilitate formation of the actuating surface 90 and to permit continuous and smooth interaction with the roller 70.

As noted above, it is possible to adjust timing between the switch 78 and the common gang plate 54 by adjusting the nuts 84 and 86 for the pump actuating element 80. However, it is also possible to separately adjust the cam shoe 58 in order to more accurately synchronize regulation or control over the pump 16 in connection with operation of the single valve 22 by the spool 26.

For this purpose, the cam shoe 58 is secured to the gang plate 54 by threaded screws 98 which extend through elongated openings, such as that indicated at 100, within the gang plate 54. The cam shoe 58 may thus be moved slightly upwardly or downwardly as viewed in FIG. 2, to adjust synchronization of the single pump 16 relative to the one valve 22. It would also be possible, for example, to loosen only the upper screw 98 and insert shims (not shown) between the cam shoe 58 and the gang plate 54 in order to vary the upper portion 94 of the actuating surface. The configuration of the actuating surface 90 could also be changed, for example, by removing or building up the elastomeric material of the cam shoe along selected portions of the actuating surface.

FIG. 3 represents a separate embodiment, particularly with reference to configuration of the cam shoe, for operation of a double-acting hydraulic jack or motor. Further, the components illustrated within FIG. 3 are selected to correspond with the combination of control lever 40, spool 34, cam shoe 62, etc., as arranged toward the left end of the synchronizing unit 10 in FIG. 1. For use in conjunction with a double-acting jack, it will be obvious that movement of the control spool 34 in one direction will communicate the inlet conduit 20 with one end of the jack while movement of the spool in the opposite direction from its neutral position illustrated in FIG. 3 will communicate the inlet conduit 20 with the opposite end of the jack. In that event, the spool is also configured to simultaneously communicate the opposite end of the jack with the sump 18.

Close regulation of the pump 16 is desirable upon movement of the control lever 40 either leftwardly or rightwardly to effect either upward or downward movement of the spool 34. Accordingly, the cam shoe 62 is similarly formed with an actuating surface 102 having a central point 104 for engagement with the bearing or roller 74 when the control lever 40 is in its central or neutral position.

An upper portion 106 of the actuating surface 102 is configured similarly as the upper surface 94 of the cam shoe 58 of FIG. 2. Accordingly, when the control lever 40 is shifted leftwardly as viewed in FIG. 3 to raise the spool 34, the roller 74 acts against the cam shoe in a manner similar to that described above in connection with FIG. 2 to urge the gang plate 54 rightwardly and cause the switch 78 to initiate operation of the electrical motor 76 and pump 16. Operation of the pump 16 is of course again terminated as the roller 74 again approaches the central point 104.

A lower portion 108 of the actuating surface 102 differs substantially, however, from the lower surface portion 92 of the cam shoe 58 in order to initiate operation of the pump when the spool 34 and roller 74 are shifted downwardly. It may be further seen by reference to FIG. 3 that the lower surface portion 108 is formed at a much greater angle relative to the gang plate 54 than the upper surface portion 106. This angular difference is to compensate for the relative movement of the roller 74 either toward or away from the shaft 56 about which the gang plate 54 pivots. Accordingly, the differential angle between the surface portions 106 and 108 is selected so that approximately the same amount of movement for the gang plate 54 is accomplished relative to movement of the roller 74 approximately the same distance either upwardly or downwardly.

The cam shoe 62 is also preferably formed from elastomeric material and similarly secured to the gang plate 54 by screws 110 which permit adjustment of the cam shoe 62 in substantially the same manner as described above for the cam shoe 58.

We claim:
1. In a hydraulic circuit for operating a plurality of hydraulic motors by a single pump, a separate valve being operable to communicate actuating fluid to each respective motor, each of the valves being operable by a separate movable actuating element, the single pump under pressure being in communication with each of the valves, synchronizing means for initiating operation of the pump simultaneously with movement of any one of the valves to communicate fluid from the pump to one of the motors, comprising
    a movable gang plate including means for initiating and terminating operation of the pump in response to movement of the gang plate about a fixed pivot point,
    a separate cam shoe being associated with each of the actuating elements for the respective control valves, each of the cam shoes forming an actuating surface arranged generally perpendicular to the fixed pivot axis of the gang plate, means adjustably securing the separate cam shoes to the gang plate, and a synchronizing lever connected with each actuating element for the respective control valves, each synchronizing lever having a bearing means arranged for engagement with one of the actuating surfaces upon the cam shoes, the synchronizing levers being pivotably movable in response to operation of the respective control valves by their actuating elements to move the bearing means along the actuating surfaces, each of the actuating surfaces having a configuration formed along a plane perpendicular to the fixed pivot of the gang plate for moving the gang plate and causing operation of the single pump in synchronization with the movement of each of the control valves.

2. The hydraulic circuit of claim 1 wherein the actuating surface of each cam shoe has a central point corresponding to a neutral position, the actuating surface being configured on opposite sides of the central point to synchronize operation of the single pump with the operation of a double acting hydraulic motor being regulated by the respective control valve.

3. The hydraulic circuit of claim 1 wherein the actuating surface on a selected cam shoe has a central point corresponding to a neutral position of the respective control valve and its actuating element, the actuating surface being configured on one side of the central point to actuate the pump in response to movement of the actuating element and the synchronizing lever, the other side of the central point being formed along an arc formed about the pivot point for the synchronizing lever to permit movement of the actuating element in one direction without affecting operation of the pump, the respective control valve thereby being adapted for operating a single acting hydraulic motor.

4. The hydraulic circuit of claim 1 wherein each cam shoe is secured to the gang plate by a plurality of screws passing through elongated openings in the gang plate in order to permit adjustment of the cam shoe upon the gang plate.

5. The hydraulic circuit of claim 1 wherein the means connected to the gang plate for initiating and terminating operation of the pump is adjustably secured to the gang plate in order to permit timing adjustment between movement of the plate and initiation or termination of pump operation.

6. The hydraulic circuit of claim 5 wherein the single hydraulic pump is operable by an electric switch, the switch being operable by the actuating means adjustably connected to the gang plate.

7. The hydraulic circuit of claim 1 wherein the bearing means arranged upon each synchronizing lever comprises a rotatable roller.

* * * * *